United States Patent [19]

Trapasso et al.

[11] 4,037,040
[45] July 19, 1977

[54] REFLUXING WATER-IN-OIL EMULSION PROCESS FOR PREPARING WATER-SOLUBLE POLYELECTROLYTE PARTICLES

[75] Inventors: Louis E. Trapasso, Watchung; Charles V. Juelke, Bellemead, both of N.J.

[73] Assignee: Celanese Corporation, New York, N.Y.

[21] Appl. No.: 664,852

[22] Filed: Mar. 8, 1976

Related U.S. Application Data

[63] Continuation of Ser. No. 497,354, Aug. 14, 1974, abandoned.

[51] Int. Cl.² ............... C08F 2/32; C08F 232/00; C08F 236/00
[52] U.S. Cl. ............... 526/88; 260/29.6 WQ; 260/79.3 M; 260/79.5 C; 526/206; 526/207; 526/240; 526/303; 526/909
[58] Field of Search ............... 526/206, 526/207, 88; 260/29.6 WQ, 79.3, 79.5 C

[56] References Cited

U.S. PATENT DOCUMENTS

| | | | |
|---|---|---|---|
| 2,566,162 | 8/1951 | Caldwell | 260/79.3 |
| 2,904,541 | 9/1959 | Barrett | 260/89.7 |
| 2,982,749 | 5/1961 | Friedrich et al. | 260/80 M |
| 2,983,717 | 5/1961 | Henley | 260/80.3 |
| 3,211,708 | 10/1965 | Zimmermann et al. | 260/89.7 R |
| 3,278,506 | 10/1966 | Chamot et al. | 526/207 |
| 3,284,393 | 11/1966 | van Derhoff et al. | 526/207 |
| 3,432,483 | 3/1969 | Peoples et al. | 260/80 M |
| 3,450,680 | 6/1969 | Jurisch et al. | 260/29.6 X |
| 3,689,468 | 9/1972 | Cenci et al. | 260/86.1 N |
| 3,814,742 | 6/1974 | Nagy | 526/88 |

*Primary Examiner*—Joseph L. Schofer
*Assistant Examiner*—Herbert J. Lilling

[57] ABSTRACT

There is provided a process for preparing water-soluble polyelectrolytes by a water-in-oil emulsion process. A mixture of a surfactant, free radical initiator, at least one water-soluble, oil-insoluble, ethylenically unsaturated monomer adapted to polymerize under refluxing conditions, oil and water (the oil and water being adapted to form an azeotropic boiling mixture) is heated with vigorous agitation. The monomer polymerizes at the reflux temperature under the vigorous agitation with a concomitant simultaneous loss of water. Finely divided, water-soluble particles result.

12 Claims, No Drawings

REFLUXING WATER-IN-OIL EMULSION PROCESS FOR PREPARING WATER-SOLUBLE POLYELECTROLYTE PARTICLES

This is a continuation, of application Ser. No. 497,354, filed Aug. 14, 1974, and now abandoned.

BACKGROUND OF THE INVENTION

Inverse emulsion (i.e., water-in-oil) polymerization techniques are well-known. For example, U.S. Pat. No. 3,284,393 discloses a process for thermally polymerizing water-soluble monomers to high molecular weight polymers or copolymers at rapid rates of polymerization using water-in-oil emulsion polymerization procedures in which at least one water-soluble monomer (which may be in aqueous solution) is emulsified in an oil phase by means of a water-in-oil emulsifier and emulsion polymerized under free radical forming conditions to form a polymeric latex in which the oil phase is the dispersion medium. A process such as above-described may be utilized to form acrylamide polymers. However, such a process is not applicable to producing such polymers in particulate form.

Various techniques have been proposed to produce water-soluble polymer particles by utilizing inverse emulsion polymerization. U.S. Pat. No. 3,278,506, for example, describes an inverse emulsion process in which a mixture of an ethylenically unsaturated water-soluble monomer, water-soluble organic heat transfer medium, free radical polymerization catalyst and a small amount of an antisticking agent are heated to polymerize the monomer. The polymer is sheared by agitation into particles, generally from about 1/16 inch to 2 inches diameter. Such a process, however, is incapable of forming finely divided (e.g., below about 1.0 mm.) particles.

U.S. Pat. No. 2,982, 749 describes an inverse emulsion process in which an aqueous solution of a water-soluble monomer (e.g., acrylamide) and a suspending agent (e.g., silica) are added to an oil with agitation to form finely divided globules therein. Polymerization is thereafter initiated under mild agitation conditions. It has been found, however, that particles resulting from a process as described therein tend to agglomerate during formation and have a low viscosity when re-dispersed in water. This renders such products useless in certain applications (e.g., flocculation) where high molecular weight and/or high viscosity aqueous solutions of polyelectrolytes are desirable.

OBJECTS AND SUMMARY OF THE INVENTION

Accordingly, a general object of the present invention is to avoid or substantially alleviate the above problems with the prior art.

A more specific object of this invention is the provision of a process fr producing particulate water-soluble polymers by an inverse emulsion technique.

Another object of this invention is to provide a process for the production of particulate polymers by an inverse emulsion process which polymers form water-soluble aqueous solutions of high viscosity with substantially no insoluble (gel) material.

Other objects and advantages of the present process will become apparent from the following summary and description of the preferred embodiments of the present invention.

In one aspect of the present invention there is provided a process for the production of finely divided, water-soluble polymeric particles which comprises heating to reflux under vigorous agitation, a mixture of a surfactant, a free radical initiator, at least one water-soluble, oil-insoluble ethylenically unsaturated monomer adapted to polymerize under refluxing conditions, oil and water, said oil and water being adapted to form an azeotropic boiling mixture, whereby said monomer polymerizes in the form of finely divided particles and water is simultaneously separated therefrom, and recovering finely divided, water-soluble, polymeric particles from said mixture.

In another aspect, the present invention provides the finely divided, water-soluble polymeric particles resulting from the above-defined process.

DESCRIPTION OF THE PREFERRED EMBODIMENTS

In accordance with the process of the present invention, all known polymerizable water-soluble ethylenically unsaturated monomers the polymers of which are water-soluble and insoluble in the continuous oil phase can be polymerized by the herein-defined water-in-oil emulsion polymerization process to form finely divided particles of the polymeric material.

In this specification, the term "water-soluble, oil-insoluble monomer" is intended to include not only particular water-soluble, oil-insoluble monomers but is also intended to include combinations of two or more such monomers which when polymerized produce water-soluble copolymers, terpolymers, etc. The water-soluble monomers of the present process include acrylamide, methacrylamide, acrylic acid, alkali metal salts of acrylic acid, methacrylic acid, dimethylaminoethyl methacrylate, vinylbenzyl trimethylammonium chloride, alkali metal and ammonium salts of 2-sulfoethylacrylate, sodium styrene sulfonate, 2-aminoethylmethacrylate hydrochloride, alkali metal and ammonium salts of vinyl benzyl sulfonates and the like. Preferably, the aqueous feed solution includes acrylamide or methacrylamide as the monomer or as one of the monomers.

Free radical polymerization initiators adapted to initiate polymerization of the ehtylenically unsaturated monomer under refluxing conditions include peroxide catalysts such as t-butyl hydroperoxide. Free radical polymerization initiators also include redox systems such as t-butyl hydroperoxide, ammonium persulfate, or potassium persulfate in combination with conventional reductants (e.g., sodium metabisulfite, zinc formaldehyde sulfoxylate, and sodium formaldehyde sulfoxylate). A preferred polymerization initiator/reductant combination is potassium persulfate and sodium metabisulfite.

In the practice of the present process, the water-soluble, oil-insoluble ethylenically unsaturated monomer (or mixture of such monomers) is polymerized by heating to reflux under vigorous agitation a mixture of the said water-soluble monomer, minor amounts of a polymerization initiator and a surfactant, water and oil in which the water and oil are present in an azeotropic mixture.

The water-soluble, oil-insoluble ethylenically unsaturated monomer can be present in varying concentrations in the mixture but is generally present in a concentration of from about 2 or more to about 60, typically from about 5 to about 30, and preferably from about 10 to about 25, percent by weight based upon the total weight of the reaction mixture.

In a particularly preferred embodiment of the present invention, the aqueous feed solution includes acrylamide (or methacrylamide) as one of the monomers. The acrylamide (or methacrylamide) and the other monomers can be present in any weight ratio, but generally a weight ratio of acrylamide to the "other" monomer of from about 20:1 to about 1:1, typically from about 10:1 to about 1.5:1, and preferably from about 4:1 to about 1.9:1 is employed.

The free radical polymerization initiator is present in a minor amount sufficient to initiate polymerization at the reflux temperature, which amount is generally from about 0.002 to about 0.01, typically from about 0.004 to about 0.008, preferably from about 0.005 to about 0.007, percent by weight based upon the total weight of the reaction mixture.

The oil phase can be any inert hydrophobic liquid in which the water-soluble ethylenically unsaturated monomer is insoluble, which forms an azeotropic mixture with minor amounts of water and which can readily be separated from the disperse phase polymeric product. Such liquids include toluene, xylene, o-dichlorobenzene, monochlorobenzene, ethylene dichloride, and the like. Hydrocarbons and chlorohydrocarbons such as perchloroethylene are advantageous. Arylhydrocarbons such as toluene and xylene are particularly preferred oil phase liquids.

The particular composition of the water-in-oil mixture will, of course, vary depending upon the particular materials chosen although a higher percentage of oil than water will always be present in the mixture. Generally, the oil is present in the water-in-oil emulsion in an amount of from about 30 to about 80, typically from about 50 to about 75, and preferably from about 55 to about 70, percent by weight based upon the total weight of the reaction mixture while the water is generally present in an amount of from about 5 to about 35, typically from about 10 to about 25, and preferably from about 14 to about 22, percent by weight based upon the total weight of the reaction mixture.

The water-in-oil emulsion also generally contains an emulsifier in a concentration sufficient to emulsify the water and oil which amount is generally from about 1.0 to about 10.0, typically from about 1.5 to about 6.0, and preferably from about 2.0 to about 4.0, percent by weight based upon the total weight of the reaction mixture.

The water-in-oil emulsifying agents which can be used in the present process include sorbitan monooleate, sorbitan monostearate, diglycerol monostearate, and their ethoxylated derivatives.

The present process may be carried out at atmospheric, subatmospheric, or superatmospheric pressure, generally at a pressure of from about 15 to about 1500, typically from about 300 to about 800, and preferably from about 700 to about 790, millimeters of mercury. However, superatmospheric pressure is advantageously used when volatile ingredients are employed.

The refluxing temperature of the water-in-oil azeotropic mixture will vary depending upon the particular azeotropic mixture formed but is generally in the range of from about 50° to about 120°, typically from about 75° to about 115°, and preferably from about 85° to about 110° C.

In practice, the monomer (or monomers) are dissolved in water and the polymerization initiator is admixed. The surfactant is dissolved in the oil phase and the aqueous solution admixed with agitation.

The water-in-oil inverse emulsion mixture is then heated to reflux with vigorous agitation. It has been found to be essential to the practice of the present invention to maintain the mixture under vigorous agitation before and during heating to reflux. Agitator velocity is, of course, a function of sample size but generally a speed of from about 200 to about 700, typically from about 250 to about 600, and preferably from about 300 to about 400 rotations per minute is employed. Any conventional type of agitator (such as a turbine agitator) which provides such vigorous agitation may be employed.

The aqueous phase is dispersed in the oil phase throughout the process as minute monomer solution droplets.

Polymerization takes place within the aqueous droplets and occurs essentially immediately and water is azeotropically separated substantially simultaneously with polymerization to dry the product. The water can be removed by placing a Dean-Stark trap into the vapor line of the system. The polymerization medium containing the desired particulate polymeric product is then cooled to room temperature and the product isolated by suction filtration.

The product formed is granular and uniform in particle size. Each particle appears to be an aggregation of tiny spheres. Generally, the product obtained has an average particle diameter of from about 100 to about 2000, typically from about 300 to about 1000, preferably from about 300 to about 800, microns.

Frequently, a yield in excess of 100 percent of theory is obtained because of the difficulty in drying the spheres. However, on a dry basis, the product is obtained in a yield of generally at least 90, typically at least 95, and preferably at least 98, percent by weight based on the theoretical yield from the monomer feed.

These particles may be dissolved in aqueous solution in amounts of up to about 1.0 percent without any substantial gel formation and without special dissolution and/or mixing procedures. The Brookfield viscosity of a 1 percent aqueous solution of these polymer particles is typically in the range of from about 200 to about 4000, often from about 400 to about 2500, centipoise.

The polymeric particles of the present invention are useful as binders in coating compositions, and as flocculating, suspending or thickening agents.

The present invention is further illustrated by the following Examples which are to be considered as illustrative of the present invention. It should be understood, however, that the invention is not limited to the specific details of the Examples. All parts and percentages in the Examples as well as in the specification and claims are by weight unless otherwise specified.

EXAMPLE I

A water-in-oil emulsion mixture is formed by first mixing 360 grams of toluene and 12 grams of a surfactant (sorbitan monooleate) added to the toluene with stirring.

An aqueous monomer solution is formed by mixing 84 grams of acrylamide, 90 grams of a 40 percent by weight aqueous solution of quaternized dimethylamnoethyl methacrylate, 44 grams of water, and 10 grams of a 0.3 percent by weight aqueous solution of ammonium persulfate (polymerization initiator).

The dimethylaminoethyl methacrylate is obtained from the Alcolac Chemical Company. The material is quaternized by reaction at a temperature of 68° to 70° C for 4.5 hours with 4-chloro-2-butenyl trimethylammonium chloride in the presence of water (as described, for example, at column 9 of U.S. Pat. No. 3,689,468) and has the following composition as determined by combined gas chromatography and mass spectrometry.

| Component | Percentage |
|---|---|
| Water | 0.29 |
| Methylmethacrylate | 0.98 |
| Dimethylaminoethanol | 4.80 |
| Dimethylaminoethyl methacrylate | 93.94 |

The aqueous monomer solution is prepared by adding the acrylamide and quaternized dimethylaminoethyl methacrylate solution to the water and then admixing with agitation of 360 rotations per minute (using a turbine agitator) the ammonium persulfate at atmospheric pressure and 25° C.

The monomer solution is then added to the toluene and surfactant mixture and the resulting mixture heated to reflux (about 85° C.) at atmospheric pressure. Using a turbine agitator, vigorous agitation (360 rotations per minute) is maintained during mixing of the aqueous solution with the toluene and the heating to and at the reflux temperature of the resulting mixture. The azeotropic vapor temperature rises as water is removed to 109° C. at shut down. Polymerization occurs at the reflux temperature with substantially simultaneous separation of water and formation of finely divided particles of the polymer material. A Dean-Stark trap is placed into the vapor line and water is azeotropically separated to dry the product. Upon cooling to room temperature, the product is isolated by suction filtration. The polymer particles are granular, uniform in particle size (about 500 microns average particle diameter). Each particle appears to be an aggregate of tiny spheres. The Brookfield viscosity of a 1 percent (by weight) aqueous solution of these particles is 450 centipoise and the solution is essentially water-soluble.

In order to obtain beads and prevent glob formation, it is necessary to keep the concentration of reactants, surfactant, initiator and solvents within the ranges stated and also to sufficiently agitate the emulsion.

EXAMPLE II

Example I is repeated using 64.4 g. of acrylamide and 16.2g. of the quaternized dimethylaminoethyl methacrylate. The inverse polymerization medium contained 13.4 weight percent polymer precursor solids and 17.8 weight percent water. The Brookfield viscosity of a 1 percent (by weight) aqueous solution of the polymer particles obtained (about 500 microns average particle diameter) is 450 centipoise. The product is obtained in a yield of 99 percent of theory (dry basis).

EXAMPLE III

Example II is repeated using 77. 4 g. of acrylamide homopolymer and 96.6 g. of water with a concentration of polymer precursor solids of 12.9 weight percent and a water content of 16.1 weight percent. The Brookfield visosity of 1.0 weight percent aqueous solution of the polymer particles obtained (about 400 microns average particle diameter) is between 200 and 460 centipoise. The product is obtained in a yield of 99 percent of theory (dry basis).

EXAMPLE IV

The procedure of Example I is repeated using, however, as the polymerizatin initiator a.redox system of t-butyl hydroperoxide and sodium metabisulfite. The inverse emulsion contains 84 g. of acrylamide and 36 g. of quaternized dimethylaminoethyl methacrylate (available as "Sipomer Q-5" from Alcolac Chemical Company) with a concentration of polymer precursor solids of 20 weight percent and a water content of 18 weight percent. The Brookfield viscosity of a 1 weight percent aqueous solution of the polymer particles obtained (about 500 microns average particle diameter) in 725 centipoise. The product is obtained in a yield of 98 percent of theory (dry basis).

EXAMPLE V

Example IV is repeated using a mixture of 70 mole percent acrylamide and 25 mole percent sodium acrylate with a concentration of polymer precursor solids of 14.6 weight percent and a water content of 14.9 weight percent. The Brookfield viscosity of a 0.5 weight percent aqueous solution of the polymer particles obtained (about 450 microns average particle diameter) is 1500 to 1950 centipoise. The product is obtained in a yield of 98 percent of theory (dry basis).

The principles, preferred embodiments and modes of operation of the present invention have been described in the foregoing specfication. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An inverse emulsion polymerization process for the production of finely divided, water-soluble polymeric particles which comprises heating to reflux under vigorous agitation of from about 200 to about 700 rotations per minute a water-in-oil-inverse emulsion of a surfactant, a free radical initiator, at least one water soluble, oil-insoluble ethylenically unsaturated monomer adapted to polymerize under refluxing conditions, oil, and water wherein the percent by weight of oil is higher than the percent by weight of water, said oil and water being adapted to form an azeotropic boiling mixture, to cause said monomer to polymerize within aqueous droplets dispersed in the emulsion to form finely divided particles and to cause water to be simultaneously separated therefrom, and recovering finely divided water-soluble polymeric particles.

2. The process of claim 1 wherein the ethylenically unsaturated water-soluble monomers of the present process are selected from the group consisting of acrylamide, methacrylamide, acrylic acid, alkali metal salts of acrylic acid, methacrylic acid, dimethylaminoethyl methacrylate, vinylbenzyl trimethylammonium chloride, alkali metal and ammonium salts of 2-sulfoethylacrylate, sodium styrene sulfonate, 2-aminoethylmethacrylate hydrochloride, alkali metal and ammonium salts of vinylbenzyl sulfonates and mixtures thereof.

3. The process of claim 2 wherein said monomer includes acrylamide or methacrylamide.

4. The process of claim 2 wherein the free radical polymerization initiators include peroxide catalysts and redox systems.

5. The process of claim 1 wherein said refluxing takes place at a temperature of from about 50 to about 120° C. and at a pressure of from about 15 to about 1500 millimeters of mercury and wherein said particulate product has an average particle diameter of from about 100 to about 2000 microns.

6. An inverse emulsion polymerization process for the production of finely divided, water-soluble polymeric particles which comprises heating to reflux under vigorous agitation of from about 250 to about 600 rotations per minute a water-in-oil inverse emulsion of from about 1 to about 10 percent by weight of a surfactant, from about 0.002 to about 0.01 percent by weight of a free radical initiator, from about 2 to about 60 percent by weight of at least one water-soluble, oil-insoluble ethylenically unsaturated monomer adapted to polymerize under refluxing conditions, from about 30 to about 80 percent by weight oil, and from about 5 to about 35 percent by weight water, wherein the percent by weight of oil is higher than the percent of weight of water and wherein all percentages are by weight of the total reaction mixture, said oil and water being adapted to form an azeotropic boiling mixture, to cause said monomer to polymerize within aqueous droplets dispersed in the emulsion to form finely divided particles and to cause water to be simultaneously separated therefrom, and recovering finely divided, water-soluble polymeric particles.

7. The process of claim 6 wherein said refluxing takes place at a temperature of from about 75° to about 115° C. and at a pressure of from about 300 to about 800 millimeters of mercury.

8. The process of claim 7 wherein said surfactant is selected from the class consisting of sodium monooleate, sodium monostearate, diglycerol monostearate, and their ethoxylated derivatives, said radical initiator is selected from the class consisting of t-butyl hydroperoxide, ammonium persulfate, and potassium persulfate, said ethylenically unsaturated monomer is selected from the class consisting of acrylamide, methacrylamide, acrylic acid, alkali metal salts of acrylic acid, methacrylic acid, and dimethylaminoethyl methacrylate, and said oil is selected from the class consisting of toluene, xylene, o-dichlorobenzene, monochlorobenzene, ethylene dichloride, and perchioroethylene.

9. The process of claim 7 wherein said ethylenically unsaturated monomer comprises a mixture of acrylamide and dimethylaminoethyl methacrylate.

10. The process of claim 1 wherein said oil is selected from the group consisting of toluene, xylene, o-dichlorobenzene, monochlorobenzene, ethylene dichloride, and perchloroethylene.

11. An inverse emulsion polymerization process for the production of finely divided, water-soluble polymeric particles which comprises heating to reflux under vigorous agitation of from about 300 to about 400 rotations per minute, at a temperature of from about 85° to about 110° C and at a pressure of from about 700 to about 790 millimeters of mercury a water-in-oil inverse emulsion of from about 1.5 to about 6 percent by weight of sorbitan monooleate, from about 0.004 to about 0.008 percent by weight of ammonium persulfate, from about 5 to about 30 percent by weight of a mixture of acrylamide and dimethylaminoethyl methacrylate, from about 50 to about 75 percent by weight toluene, and from about 10 to about 25 percent by weight water wherein all percentages are by weight of the total reaction mixture, said oil and water being adapted to form an azeotropic boilin mixture, to cause said acrylamide and dimethylaminoethyl methacrylate to polymerize within aqueous droplets dispersed in the emulsion in the form of finely divided particles and to cause water to be simultaneously separated therefrom, and recovering finely divided, water-soluble polymeric particles.

12. The process of claim 11 wherein the acrylamide and dimethylaminoethyl methacrylate are present in a weight ratio of acrylamide to dimethylaminoethyl methacrylate of from about 20:1 to about 1:1.

* * * * *